(12) United States Patent
Carbonini

(10) Patent No.: US 10,154,754 B2
(45) Date of Patent: Dec. 18, 2018

(54) APPARATUS AND METHOD FOR MANAGING WATER LEVELS IN A BOILER OF A COFFEE MACHINE

(71) Applicant: RANCILIO GROUP S.P.A., Villastanza di Parabiago (MI) (IT)

(72) Inventor: Carlo Carbonini, Villastanza di Parabiago (IT)

(73) Assignee: RANCILIO GROUP S.P.A., Villastanza di Parabiago (MI) (IT)

( * ) Notice: Subject to any disclaimer, the term of this patent is extended or adjusted under 35 U.S.C. 154(b) by 253 days.

(21) Appl. No.: 15/029,700

(22) PCT Filed: Sep. 17, 2014

(86) PCT No.: PCT/IB2014/064582
§ 371 (c)(1),
(2) Date: Apr. 15, 2016

(87) PCT Pub. No.: WO2015/056118
PCT Pub. Date: Apr. 23, 2015

(65) Prior Publication Data
US 2016/0242597 A1 Aug. 25, 2016

(30) Foreign Application Priority Data
Oct. 17, 2013 (IT) .............................. TO2013A0842

(51) Int. Cl.
*G01F 23/00* (2006.01)
*A47J 31/56* (2006.01)
(Continued)

(52) U.S. Cl.
CPC ............. *A47J 31/56* (2013.01); *A47J 31/465* (2013.01); *F22D 5/26* (2013.01)

(58) Field of Classification Search
CPC . A47J 31/56; A47J 31/465; F22D 5/26; F22D 5/30
(Continued)

(56) References Cited

U.S. PATENT DOCUMENTS 3,657,556 A * 4/1972 Foster ................... G01F 23/241
307/118
6,078,729 A 6/2000 Kopel
2014/0305313 A1* 10/2014 Waldron et al. ........ A47J 31/46
99/280

FOREIGN PATENT DOCUMENTS

EP 0313496 B1 3/1994
ES 2009867 A6 * 10/1989 .............. A47J 31/24

OTHER PUBLICATIONS

Author: Unknown, Title: Espresso Coffee Machine, Use and Maintenance Manual, Instructions for the technician, Date: May 2005, Publisher: C.M.A. S.p. A., pp. 132.*
(Continued)

*Primary Examiner* — Lisa Caputo
*Assistant Examiner* — Roger Hernandez-Prewit
(74) *Attorney, Agent, or Firm* — Howson & Howson LLP

(57) ABSTRACT

An apparatus for managing water levels in a boiler of a coffee machine is provided. The boiler is connected to a control circuit and includes a first probe arranged, in use, to measure a first water level and at least a second probe arranged to measure a second water level, or working level of the apparatus, higher than the first level. apparatus is arranged to supply steam or hot water through respective ducts connected to the boiler and controlled by respective valves. The first probe is configured for measuring a draining level of the boiler on the basis of draining commands generated by the control circuit and for automatically enabling water replacement in the boiler.

8 Claims, 4 Drawing Sheets

(51) Int. Cl.
*A47J 31/46* (2006.01)
*F22D 5/26* (2006.01)

(58) Field of Classification Search
USPC ....... 73/290 R, 307, 308, 311; 137/391, 399,
137/423; 426/433, 434
See application file for complete search history.

(56) References Cited

OTHER PUBLICATIONS

English Translation of ES 2009867 A6, Date of ES 2009867 A6, Oct. 16, 1989, Publisher of Translation: EPO, pp. 13.*

* cited by examiner

APPARATUS AND METHOD FOR
MANAGING WATER LEVELS IN A BOILER
OF A COFFEE MACHINE

TECHNICAL FIELD

The present invention generally relates to an apparatus and a method for managing water levels in a boiler of a coffee machine.

In particular, the present invention relates to an apparatus and a method allowing saving energy in the management of a boiler of a coffee machine, hereinafter generally referred to as "boiler".

More particularly, the present invention concerns the possibility of adjusting the water amount present in a boiler.

PRIOR ART

As known, usually the boiler of a coffee machine is a container filled with water up to about 50-60% of the available volume; the remaining volume is filled with pressurised steam.

Indeed the boiler, during its operation, is brought (by means of a heating resistor) to the pressure of about 1-1.5 bar, corresponding to a temperature of about 120-130° C.:

As equally known, boilers of coffee machines are used not only for heating, preferably through a heat exchanger, water for preparing coffee, but also for supplying steam through suitable nozzles arranged, for instance, to heat/foam milk and for supplying hot water, for instance for preparing hot beverages such as tea, chamomile tea and so on.

A first technical problem of the known boilers is that the water level in the boiler usually is a predetermined average level, so that the steam and hot water dispensing conditions keep substantially constant, or vary within a limited range, independently of whether rush periods (high consumption periods) or limited consumption periods are concerned.

A second problem connected to the first one is that water contained in the boiler, even if it is filled up according to the needs, undergoes a progressive degradation of chemical nature during normal use. When steam is drawn off from the boiler, possibly even in high amounts, a progressive increase in the concentration of the mineral salts dissolved in the water contained in the boiler will occur. Also the pH of such water will increase in case the incoming water has been softened for instance by means of a cation resin water softener: actually, in this case, water in which all calcium and magnesium salts have been converted into sodium salts by means of chemical substitution will be introduced into the boiler, and sodium salts, as their concentration increases, will make water in the boiler strongly basic and scarcely suitable for food use. If water is not periodically removed from the boiler, also the small amount of metals (nickel, lead, etc.) forming the metal alloys of the parts in contact with water for food use could reach concentrations which are too high for human consumption with respect to the limits suggested or imposed by existing regulations.

In case water in the boiler is used for preparing hot beverages, for instance tea, the risk thus exists of supplying water whose chemical composition is not optimal, or even is harmful.

Moreover, if water for preparing hot beverages is not periodically removed from the boiler, the existence of high salt concentrations will be, with time, a possible cause of corrosion or mineral salt deposits—

Thus, it would be useful and advantageous to periodically replace water contained in the boiler so as to prevent the occurrence of the above problems.

As far as the first technical problem is concerned, patent publication EP 0313496 A2, inter alia, discloses a boiler comprising multiple probes arranged to allow detecting different water levels in the boiler, so as to enable working with different water and steam levels in the boiler and, consequently, to allow supplying steam by taking into account the different conditions of use of the boiler.

As far as the second technical problem is concerned, a technical solution that is sometimes adopted is to periodically suggest, e.g. with daily or weekly periodicity, to dispense high amounts of hot water (when the latter comes from the boiler and not from other devices serving to the same aim) so as to replace a significant portion of the water in the boiler.

The limits of such a solution are clearly apparent, from the standpoints of the lack of guarantee of execution of the operation (with which a user, who must remember to carry out it, is entrusted), of the practicality (a boiler of a professional machine can contain from 1.5 to 16 l water, depending on its size, and drawing e.g. 5 l off is rather time consuming), and lastly of the energy (indeed, water at a temperature of 120° C. or more is wasted).

The Applicant has realised that the prior art is not capable of providing an integrated solution to the first and second technical problems, such as to ensure not only the possibility of operating with different water levels in the boiler, but also of ensuring a replacement of water present in the boiler under conditions of a maximum energy saving.

DESCRIPTION OF THE INVENTION

It is an object of the present invention to implement an apparatus and a method solving the problems mentioned above in integrated manner.

The object is achieved by the apparatus and the method for managing water levels in a boiler as claimed.

The claims are integral part of the technical teaching provided herein in respect of the invention.

The following synthetic description of the invention is provided in order to provide a basic understanding of some aspects of the invention. Such a synthetic description is not a thorough description and, as such, it is not to be intended as being suitable for identifying key or critical elements of the invention or for defining the scope of the invention. It is only aimed at setting forth some concepts of the invention in simplified form, as an anticipation of the detailed description below.

In accordance with a feature of a preferred embodiment, the apparatus includes a first probe which, in operating conditions of use, signals a water level in the boiler at which the apparatus is to be stopped, and which, under draining conditions of the boiler, signals the completion of a boiler draining step.

In accordance with another feature of the present invention, the apparatus also includes a second and a third probe arranged in the boiler at different levels and configured for making the apparatus operate under conditions of low energy consumption and conditions of high energy accumulation for higher performance, and hence of high energy consumption.

In accordance with a further feature of the present invention the apparatus, under low energy consumption conditions, will be arranged to operate with a limited number of heating members and at low operating power.

BRIEF DESCRIPTION OF THE FIGURES

The above and other features and advantages of the invention will become apparent from the following description of preferred embodiments made by way of non limiting example with reference to the accompanying drawings, in which elements denoted by a same or similar numerical reference denote elements having a same or similar function and construction, and in which.

DESCRIPTION OF PREFERRED EMBODIMENTS

Figure 1:
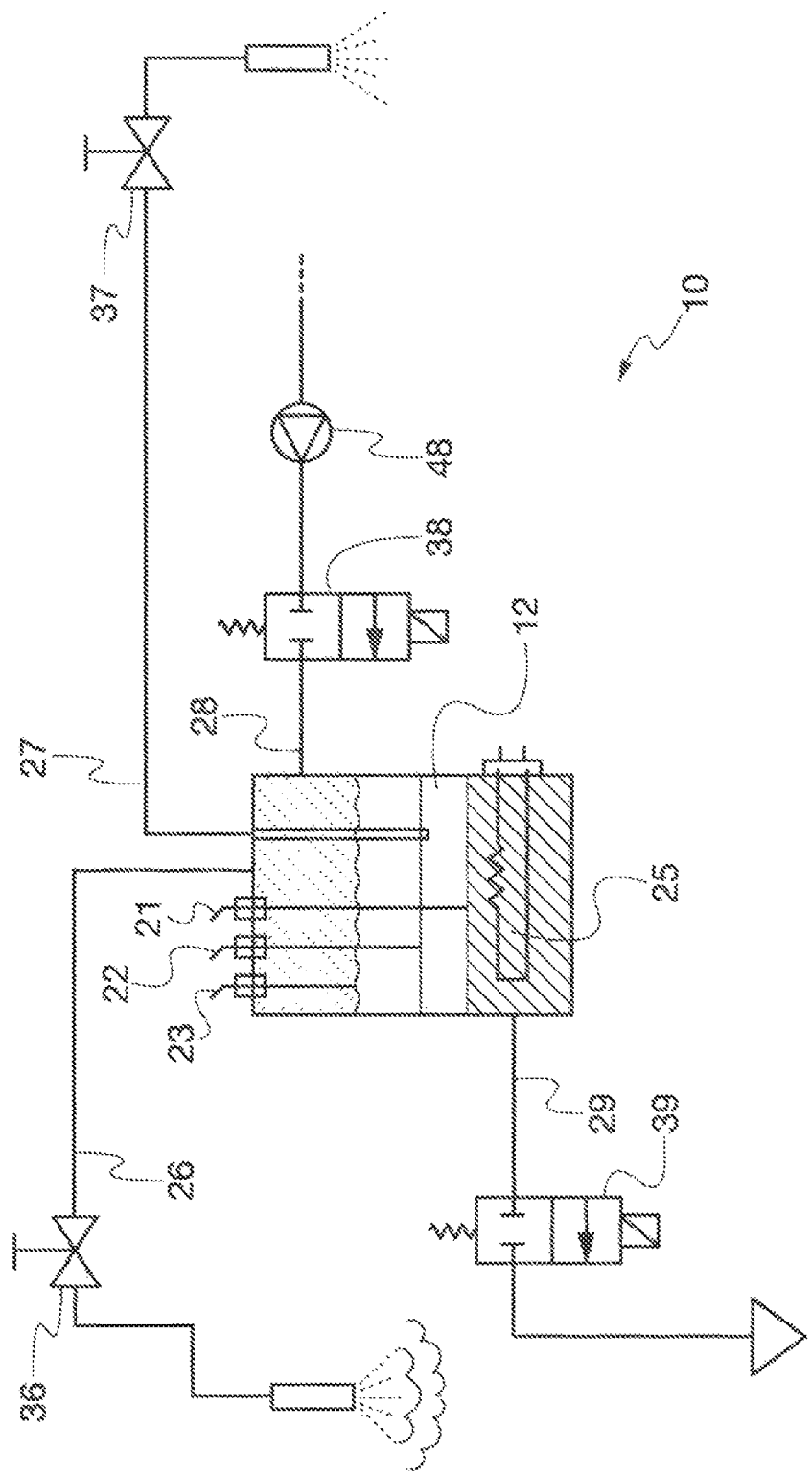
FIG. 1 is a general diagram of the apparatus according to the invention.
Figure 2:
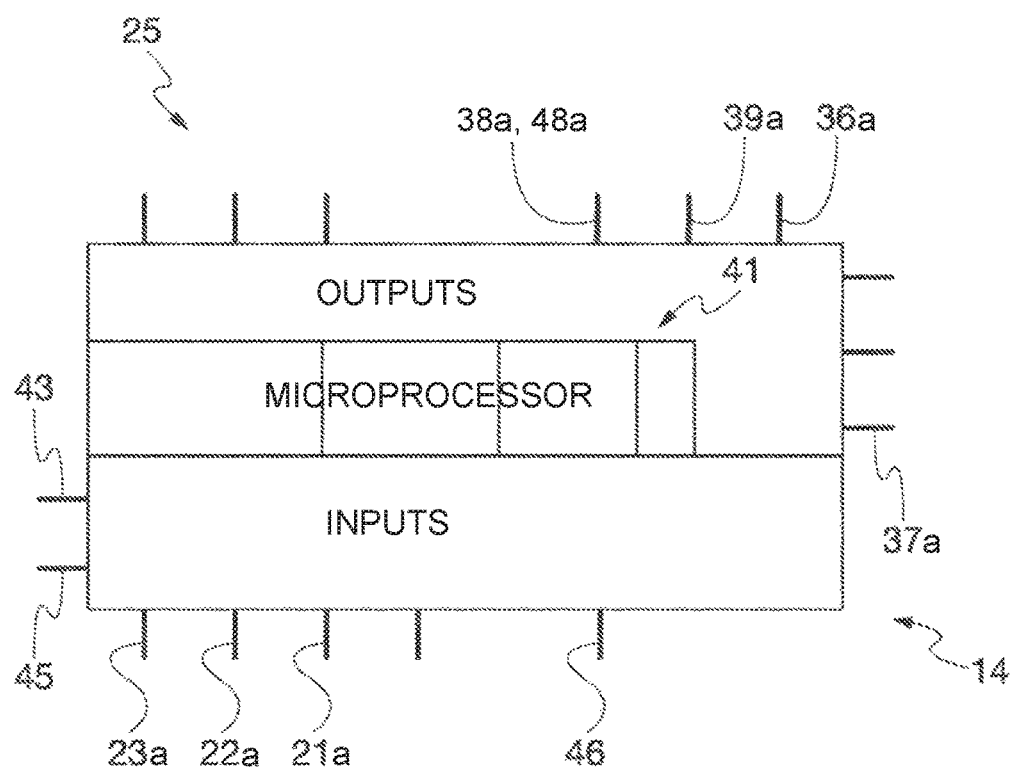
FIG. 2 shows a detail of the apparatus, not shown in FIG. 1.

Referring to FIG. 1, an apparatus 10 according to the invention includes a boiler 12 in which a plurality of level probes 21, 22, 23 are located. The probes are arranged to detect different water levels in the boiler and to transmit corresponding signals to a control circuit 14, the connections of which are shown in FIG. 2 for the sake of simplicity of illustration (FIG. 1, FIG. 2).

In the example illustrated in FIG. 1, three probes are shown, more particularly:

a first probe or safety probe 21, arranged to transmit a signal representing a safety minimum level Ls below which the apparatus cannot operate for heating water; in the present exemplary embodiment, level Ls is managed in two alternative manners:
  as a stop level for the apparatus in the operating phases thereof, i.e. when the apparatus supplies steam and/or hot water;
  as a level managing the filling of the boiler, in case a function of water replacement in the boiler is used, since the attainment of such a level is arranged to automatically enable the filling of the boiler;

a second probe, or minimum working probe 22, arranged to transmit a signal Lmin representing a minimum working level at which the apparatus is fully operative under low usage conditions and power consumption for heating water in the boiler is minimum. Actually, in accordance with the preferred embodiment, under such a working condition, the control circuit is arranged to switch on a minimum number of heating members in the boiler and hence to operate in energy saving mode. This fact has a twofold effect:
  1. first, the amount of power demand from the mains is reduced, and this in an advantageous element from the standpoint of the general electric system, since unused power can be made available for other apparatuses;
  2. second, since less water to be heated is present in the boiler in mode Lmin, it is possible to reduce power and hence to keep the ratio power/water volume almost constant in case of steam or hot water consumption. Actually, when switching the heating resistors on, the temperature variation—and hence the pressure variation—of the fluid in the boiler is less abrupt, so that the temperature value—and hence the pressure value—attained in the boiler will be very close to the target value set, thereby reducing the thermal inertia effect and the associated overrunning of the temperature/pressure values set. In synthesis, under condition Lmin, the "oscillation" effect about the target value is lower than the effect that would occur with a greater volume of water, whereby a more stable regulation of the hot water and steam temperature takes place;

a third probe, or maximum working probe 23, arranged to transmit a signal Lmax representing a maximum working level at which energy accumulation inside the boiler is maximum and hence electric power consumption in order to heat water in the boiler is higher.

Of course, in accordance with other embodiments, there can be provided a probe arranged to transmit a signal representing a safety minimum level Ls below which the apparatus cannot operate for heating water, and a different probe arranged to indicate the boiler draining level when the function of automatic water replacement in the boiler is managed.

Of course, in accordance with yet other embodiments, besides probe 21 preferably managed in alternative manner, the only minimum or maximum working probe can be provided, or more than two working probes can be provided in order to manage, for instance, also working conditions intermediate between the minimum and maximum conditions.

In the present exemplary embodiment, for the sake of simplicity of description, an apparatus is described in which probe 21 is managed in alternative manner and probes 22, 23 signalling working levels Lmin and Lmax are provided.

In the described embodiment, apparatus 10 includes, besides the probes, one or more resistors or heating members 25 arranged to heat water present in boiler 12 under the control of control circuit 14.

Preferably, three resistors 25 are provided and are electrically connected to respective phases of a three-phase power supply circuit, known per se.

In the preferred embodiment, a duct 26 arranged to supply steam through a suitable nozzle, and a duct 27 arranged to supply hot water through a respective suitable nozzle, are connected to boiler 12. Both steam and hot water are taken from the boiler in one of the possible working conditions, in the example the minimum or the maximum working level.

Preferably, the steam and hot water supply through ducts 26 and 27 is controlled by respective independent valves 36 and 37, which can be manually operated valves or electrically operated valves controlled, in known manner, by control circuit 14, the connections of which are shown in FIG. 2 for the sake of simplicity of illustration A duct 28 arranged to supply, in known manner, water coming from the hydraulic mains, for instance through a respective valve 38, e.g. an electrically controlled valve 38, and a pump of known type, both controlled by control circuit 14, is also connected to boiler 12.

In the preferred embodiment, a duct 29 arranged to enable draining or discharging water contained in the boiler through a respective electrically controlled replacement or discharge valve 39, of known type, controlled by control circuit 14, is also connected to boiler 12.

Preferably the boiler internally contains at least one heat exchanger, not shown for the sake of simplicity of description in FIG. 1, arranged to supply at least one unit for dispensing coffee, e.g. espresso coffee.

Control circuit 14 (FIG. 2) of apparatus 10 is configured so as to control the functions of the apparatus and, in the preferred embodiment, it comprises a microprocessor circuit 41, of known type, programmed in the design step of apparatus 10 so as to manage a plurality of inputs and a plurality of outputs as provided for in the apparatus.

In particular, in accordance with the present exemplary embodiment, microprocessor circuit 41 has at least the following inputs: connections 21a, 22, 23a to probes 21, 22, 23 for receiving signals Ls, Lmin, Lmax representative of the filling condition of the boiler; connections 43, for instance, to an ON/OFF switch, for receiving signals for switching the apparatus on and off; connections 45, for instance, to a further switch for receiving control signals arranged to switch the working conditions of the apparatus, for instance from Lmin to Lmax and vice versa; and connections 46 to a keyboard for receiving control signals arranged to modify operation parameters of the apparatus, or to carry out the dispensing operations.

Of course, microprocessor circuit 41 has other input connections typical of the coffee machines, such as for instance an input detecting the pressure in the boiler and possibly the temperature, such inputs being not considered here since they are well known.

Moreover, in accordance with the present exemplary embodiment, microprocessor circuit 41 has at least the following outputs: connections to resistors 25, arranged to enable controlling the working conditions of the boiler depending on the commands supplied by means of the further switch connected to the microprocessor circuit 41 via connection 45; connections 38a and 48a to electrically controlled valve 38 and to pump 48, for enabling filling the boiler; connections 39a to electrically controlled valve 39, for enabling draining the boiler; and connections 36a and 37a to electrically controlled valves 36 and 37, if provided, in order to control steam or hot water supply through suitable commands, for instance by means of a keyboard, provided through input connections to microprocessor circuit 41.

Apparatus 10 as described allows not only modifying the operating conditions of the boiler depending on the intended working load, but also carrying out boiler draining and filling operations by avoiding electric power waste.

Actually, thanks to the provision of electrically controlled replacement valve 39, it is possible to program, for instance by means of the keyboard connected to the microprocessor 41 via connection 46, the draining of the boiler in periods in which the apparatus is not active, for instance during the night or in periods preceding the activity of steam and hot water management by the apparatus.

Advantageously, the possibility of water replacement in periods in which the apparatus is not active allows avoiding waste of thermal energy, which could otherwise be used to produce steam or hot water.

Figure 3A:
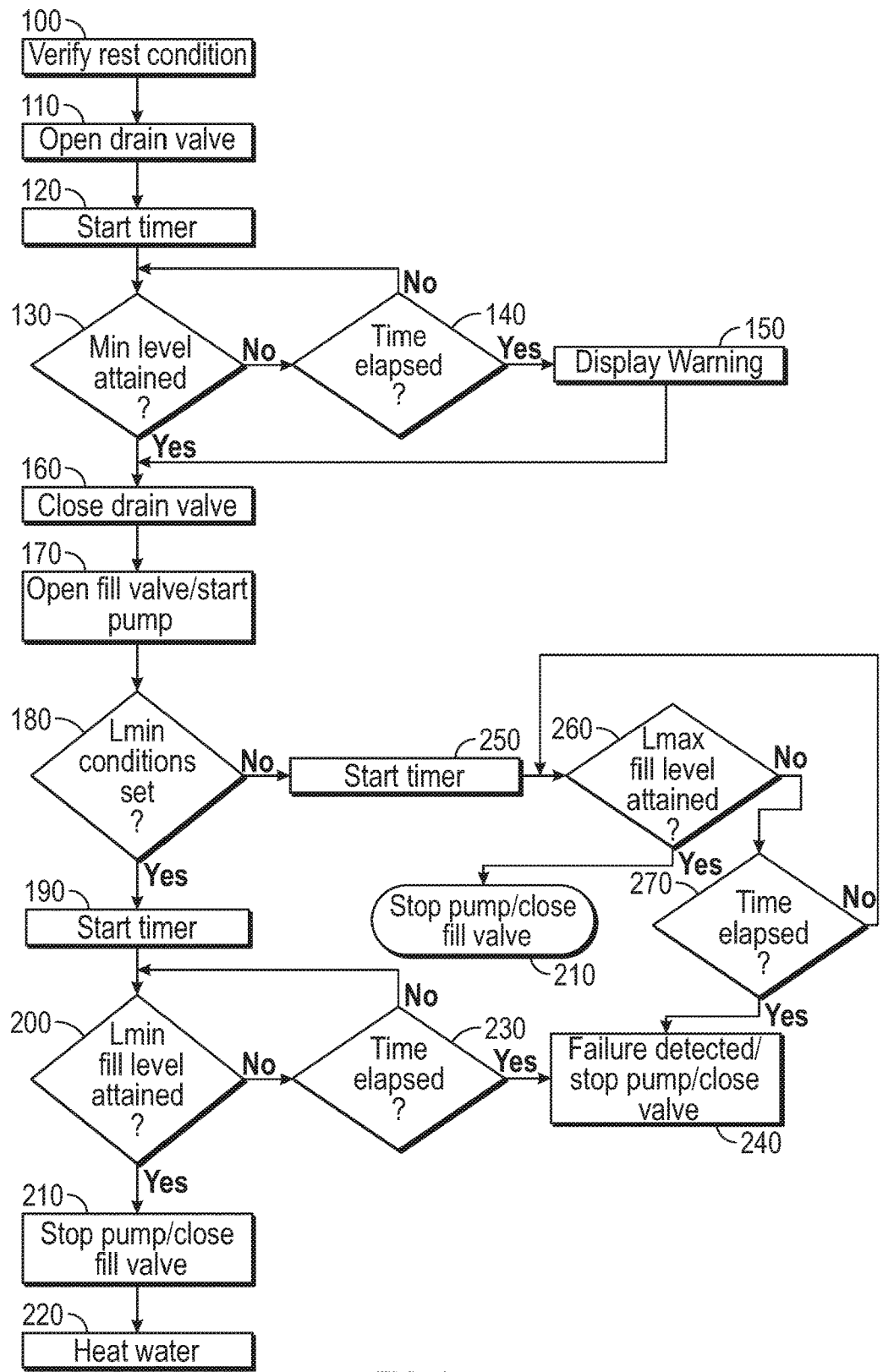
FIG. 3*a* is a block diagram of the operation of the apparatus according to the invention.

Hereinafter, a block diagram representing an exemplary operation of apparatus 10 as described is disclosed with reference to FIG. 3a.

Of course, the example provided herein is intended to show, as far as possible, an example of integration of the apparatus draining functions and of the operating functions with maximum potentiality and minimum potentiality of the apparatus.

In accordance with the illustrated diagram, in an initial step (100), apparatus 10 is in rest conditions, in which preferably water in the boiler is substantially at ambient temperature.

Such a condition may be verified by the control circuit, e.g. by checking that the apparatus has remained switched off for some hours or has been set to perform a draining function at a predetermined time.

Of course, such a step can also be carried out manually.

The subsequent steps are performed under the control of control circuit 14 and are as follows.

In a step (110) following the initial one (100), electrically controlled draining valve 39 is opened.

At the same time, in step (120), a counter associated with a maximum time value set for the draining of boiler 12, e.g. 5 minutes, is started.

In a subsequent step (130), it is checked whether level Ls has been attained during draining.

In the negative, step (140) it is checked whether the counter has reached the maximum time set. In case of positive result of step (140), a warning message is displayed, step (150), and the draining process is stopped as if draining had ended under normal conditions.

In case of negative result of step (140), step (130) is repeated.

If step (130) has a positive result, draining is completed by closing the electrically controlled draining valve, and this is automatically followed by step (170), in which electrically controlled filling valve 38 is opened and pump 48 is operated.

Once the boiler draining step is over, the boiler filling step starts.

Initially, while boiler filling pump 48 begins filling boiler 12, it is checked in step (180) whether the apparatus is set for operating under Lmin conditions or Lmax conditions.

If the apparatus is set for operating under Lmin conditions, in step (190) a counter associated with a maximum time value set in order water level attains Lmin, e.g. 10 minutes, is started.

In a subsequent step (200), it is checked whether level Lmin has been reached.

In the negative (230), it is checked whether the counter has reached the maximum time set.

In case of positive result of step (230), it is assumed, in step (240), that a failure exists in the filling circuit, or that no water coming from the hydraulic connection upstream the apparatus is available, and the apparatus as well as the electrically controlled filling valve and the filling pump are stopped.

In case of negative result of step (230), step (200) is repeated.

If level Lmin has been reached, positive result of step (200), pump 48 is stopped, electrically controlled filling valve 38 is closed and water heating resistors 25 are switched on.

If the apparatus is set for operating under Lmax conditions, the process for checking the filling to level Lmax is substantially the same as the process already described for Lmin.

Figure 3B:
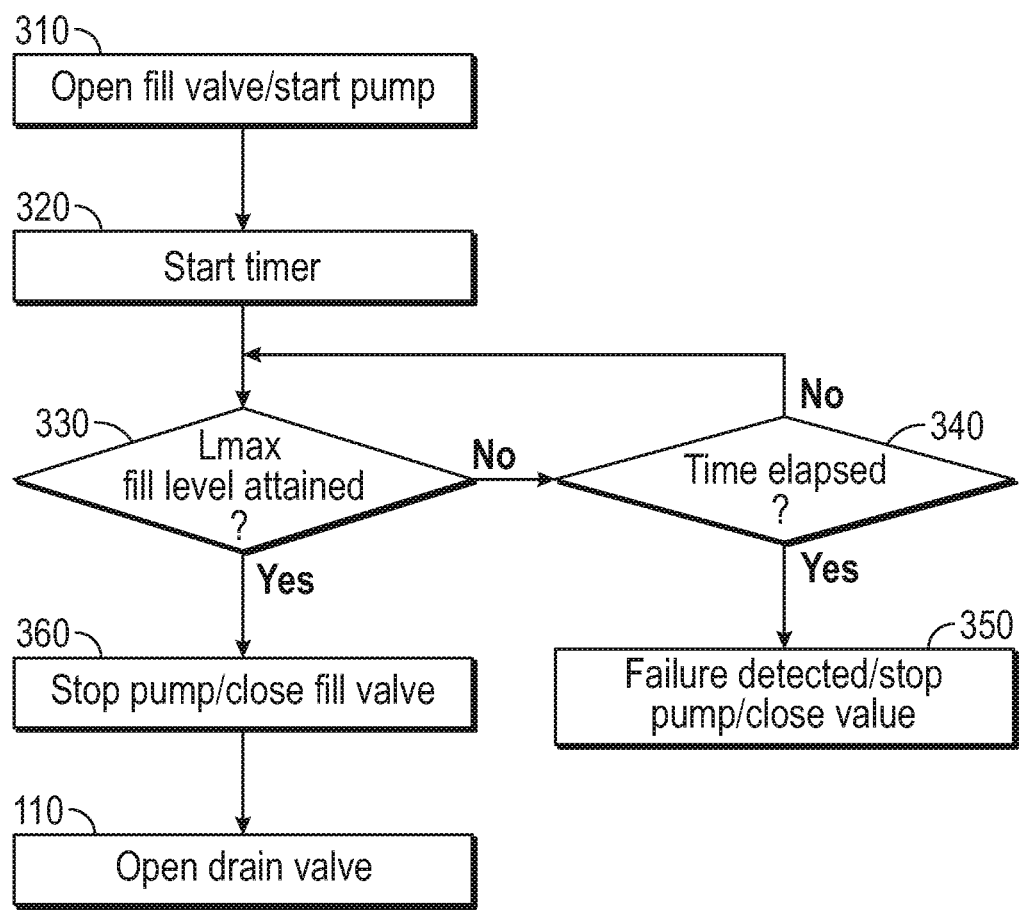
FIG. 3*b* is a block diagram representing a variant of the operation of the apparatus according to the invention.

In accordance with a variant of the above described process, shown in FIG. 3b, in case probe Lmax is provided and in order to increase water replacement in the boiler, starting from an initial step like step (100), under the control of control circuit 14, initially, step (310), electrically controlled filling valve 38 is opened and pump 48 is operated as described, and the attainment of Lmax is checked through step (320), (330) and (340). The process then continues with step (110).

If level Lmax is not reached in the set time, positive result of step (340), the apparatus as well as the electrically controlled filling valve and the filling pump are stopped.

From the description of the structure of the apparatus and of its operating manner it is clear that the boiler draining function is strictly connected with the operations for filling the boiler to the different operating levels, so that the operations for water replacement in the boiler can become routine operations without thereby affecting consumption of power supplied to the boiler resistors for heating the boiler.

Of course, obvious modifications and/or variants of the above description in respect of the size, shape, materials, components, as well as in respect of the details of the illustrated construction and the operating manner are possible without departing from the invention as set forth in the following claims.

The invention claimed is:

1. An apparatus for managing water levels in a boiler of a coffee machine, comprising:
    a boiler providing a container for a volume of water;
    heating members for heating water contained within the boiler;
    at least a first probe arranged to measure a first water level in the boiler;
    at least a second probe arranged to measure a second water level, or working level of the apparatus, higher than the first level;
    ducts connected to the boiler through which steam or hot water is supplied from the boiler;
    valves connected to the ducts for controlling passage of the steam or hot water through the ducts; and
    a control circuit including a microprocessor circuit for electronically controlling operation of the boiler via connections to the first probe, second probe, heating elements, and valves;
    wherein said first probe is configured for measuring said first water level as a level of complete draining of the boiler on the basis of draining commands generated by the control circuit and for automatically enabling a subsequent filling of the boiler;
    wherein said second probe is arranged to measure, under control of the control circuit, as the second water level a minimum level representing a minimum working level at which the apparatus is completely operative in low usage and minimum power consumption conditions for heating the water in the boiler; and
    wherein said control circuit is configured to switch on a limited number of the heating members and reduce power and maintain almost unchanged a ratio power/water volume in case of steam or hot water consumption when the minimum working level of water within the boiler is verified by the second probe.

2. The apparatus according to claim 1, wherein said first probe is further arranged to measure, when the apparatus is in use, said first water level as the level at which the apparatus is stopped by the control circuit.

3. The apparatus according to claim 1, wherein said boiler is connected to a draining duct controlled by an electrically controlled draining valve, and a filling duct controlled by a pump and by an electrically controlled filling valve configured for being managed by the control circuit arranged to successively command the draining of the boiler by opening the electrically controlled draining valve, and the filling of the boiler by actuating the pump and the electrically controlled filling valve.

4. The apparatus according to claim 1,
    further comprising:
    a third probe arranged to transmit a signal representing a level higher than the second water level, namely a maximum working level at which the apparatus is completely operative under high usage and power consumption conditions for heating the water in the boiler.

5. A method for managing water levels in a boiler of a coffee machine, comprising the steps of:
    verifying by means of a control circuit or manually that the apparatus is in a rest condition;
    starling a process of boiler draining/filling controlled by the control circuit,
        comprising the steps of:
        commanding the opening of a draining valve;
        verifying with a first probe that the water has reached a predefined minimum level;
        closing the draining valve;
        opening a filling valve and starting a pump connected to a water system;
        verifying with at least a second probe that at least a predefined filling level of the boiler has been reached;
        closing the filling valve and stopping the pump;
    starting a process for heating the water in the boiler as a function of the predefined filling level of the boiler that has been reached, wherein, when the predefined filling level is a minimum working level of the boiler, the control circuit switches on a limited number of heating members of the boiler and reduces a power and maintains almost unchanged a ratio power/water volume in case of steam or hot water consumption.

6. The method according to claim 5, wherein said verifying steps provide that the control circuit verifies with a probe the reaching of a predetermined level within a predetermined time.

7. The method according to claim 5, wherein during the process of draining the boiler, the step of verifying with a first probe that the water has reached a predetermined minimum level comprises the steps of:
    starting a counter associated to a predetermined time value required for the water to reach a predefined minimum level;
    in case said predefined minimum level is not reached within the predetermined time:
        activating a warning signal and stopping the draining process as if the draining were regularly finished.

8. The method according to claim 5, wherein during the process of filling the boiler, the step of verifying with at least a second probe that the water has reached a predefined filling level comprises the steps of:
    starting a counter associated to a predetermined time value required for the water to reach the predefined filling level;
    in case said predefined filling level is not reached within the predetermined time:
        stopping the apparatus as well as the filling valve and the pump.

* * * * *